United States Patent [19]
Nielsen et al.

[11] Patent Number: 5,778,137
[45] Date of Patent: Jul. 7, 1998

[54] VIDEOSTREAM MANAGEMENT SYSTEM

[75] Inventors: Jakob Nielsen, Atherton; Bruce Tognazzini, Woodside, both of Calif.

[73] Assignee: Sun Microsystems, Inc., Mountain View, Calif.

[21] Appl. No.: 579,784

[22] Filed: Dec. 28, 1995

[51] Int. Cl.⁶ ................................................ H04N 5/91
[52] U.S. Cl. ........................................ 386/68; 386/69
[58] Field of Search .............................. 386/1, 4, 46, 52, 386/83, 22, 33, 32, 68, 69, 109, 125; 360/32, 33.1; H04N 5/91

[56] References Cited

U.S. PATENT DOCUMENTS

| | | | |
|---|---|---|---|
| 3,646,260 | 2/1972 | Bolger | 178/6.6 A |
| 3,733,444 | 5/1973 | French, Jr. | 179/100.2 B |
| 4,040,098 | 8/1977 | Beeson et al. | 360/14 |
| 4,100,607 | 7/1978 | Skinner | 364/900 |
| 4,115,819 | 9/1978 | Shigeta | 360/14 |
| 4,283,745 | 8/1981 | Kuper et al. | 360/13 |
| 4,322,814 | 3/1982 | Menezes et al. | 364/900 |
| 4,340,916 | 7/1982 | Menezes | 360/72.2 |
| 4,354,207 | 10/1982 | Chesley | 360/9.1 |
| 4,360,843 | 11/1982 | Menezes et al. | 360/72.2 |
| 4,365,313 | 12/1982 | Menezes et al. | 364/900 |
| 4,394,745 | 7/1983 | Menezes et al. | 364/900 |
| 4,532,502 | 7/1985 | Menezes et al. | 340/717 |
| 4,591,931 | 5/1986 | Baumeister | 360/72.1 |
| 4,618,895 | 10/1986 | Wright | 358/311 |
| 4,746,994 | 5/1988 | Ettlinger | 360/13 |
| 4,774,600 | 9/1988 | Baumeister | 560/14.1 |
| 4,787,063 | 11/1988 | Muguet | 364/900 |
| 4,858,027 | 8/1989 | Sashou et al. | 358/311 |
| 4,899,229 | 2/1990 | Hashimoto | 360/141 |
| 4,977,455 | 12/1990 | Young | 358/142 |
| 5,029,013 | 7/1991 | Hiratsuka et al. | 358/335 |
| 5,032,926 | 7/1991 | Imai et al. | 358/335 |
| 5,065,251 | 11/1991 | Shuhart, Jr. et al. | 358/108 |
| 5,109,482 | 4/1992 | Bohrman | 395/154 |
| 5,182,677 | 1/1993 | Kizu et al. | 360/14.2 |
| 5,189,563 | 2/1993 | Breslau et al. | 360/14.1 |
| 5,231,512 | 7/1993 | Ebihara et al. | 358/335 |
| 5,331,417 | 7/1994 | Soohoo | 348/584 |
| 5,335,277 | 8/1994 | Harvey et al. | 380/20 |
| 5,353,121 | 10/1994 | Young et al. | 348/563 |
| 5,377,051 | 12/1994 | Lane et al. | 360/33.1 |
| 5,434,678 | 7/1995 | Abecassis | 386/52 |
| 5,438,423 | 8/1995 | Lynch et al. | |
| 5,448,315 | 9/1995 | Soohoo | 348/722 |
| 5,568,275 | 10/1996 | Norton et al. | 386/52 |

FOREIGN PATENT DOCUMENTS

| | | |
|---|---|---|
| 0 618 726 | 10/1994 | European Pat. Off. |
| 44 08 131 | 7/1995 | Germany |
| 5-347085 | 12/1993 | Japan |
| 6-014289 | 1/1994 | Japan |
| 7-212327 | 8/1995 | Japan |
| 8-153350 | 6/1996 | Japan |

OTHER PUBLICATIONS

Markoff, "A Little Something Extra Beside Your TV Image," *New York Times*, Oct. 23, 1995.

*Primary Examiner*—Robert Chevalier
*Attorney, Agent, or Firm*—Townsend and Townsend and Crew LLP

[57] ABSTRACT

An improved videostream management system. A videostream broadcast or recording includes a relevance level indicator. When a user is unable to view a portion of a videostream, the user may record a highlight videostream. The highlight video is assembled by selecting portions of the videostream for recordation based on the relevance indicator transmitted in conjunction with the basic videostream. The user may then replay highlights of the basic videostream at a later time, without the need for manual editing of the videostream, or for reviewing the entire video stream.

22 Claims, 2 Drawing Sheets

VIDEOSTREAM MANAGEMENT SYSTEM

BACKGROUND OF THE INVENTION

The present invention relates to the field of video management systems. In one specific embodiment the invention provides a system and method for selective replay of a videostream based on an edit criteria such as excitement level.

Videostreams are often viewed by a video system user in real time. That is, the user views the videostream as it is broadcast, or even as the event actually occurs. Typical videostreams include those broadcast over mass media television. These videostreams include sporting events (e.g., a baseball game), political debates (e.g., a Senate or committee hearing), news coverage (natural disasters, and broadcasts about other events of interest).

Other video applications are beginning to emerge. As computers become more prolific and as data transmission systems become more sophisticated, it is expected that the line between conventional television and computers will become more blurred. For example, systems already exist for playing video on a computer screen, and transmitting videostreams over a computer network for video conferencing. Conversely, television systems already exist that can display video on demand, provide sophisticated schedule data sorting, and other traditionally computer-related functionality.

In any of these video applications, a user may not desire to continuously view the videostream. As a simple example, viewers of a video event such as a sporting event are often drawn away from the event to answer, for example, telephone calls or cook dinner. Often a user wishes to be brought "up-to-date" on the events that take place in the user's absence without the need to review, for example, a video tape covering the entire user's absence.

Video replay and editing systems are well known to those of skill in the art. It is well known that manual editing can be performed sometime after the event, and a manually edited tape replayed at a later time. Such systems have in fact become quite sophisticated. Typical examples are disclosed in U.S. Pat. Nos. 5,109,482 and 5,029,013. Such systems suffer from a variety of limitations, however. These limitations include the time delay required for the manual editing to take place. Further, such editing systems are often directed to masses of users, and may not be responsive to the desires of a particular user.

From the above it is seen that an improved videostream management system is needed.

SUMMARY OF THE INVENTION

An improved videostream management system is provided by virtue of the present invention. According to a specific embodiment of the invention, a videostream broadcast or recording includes a relevance level indicator. Such level indicators often will take the form of an "excitement" level in the most immediate applications. When a user is unable to view a portion of a videostream the system may record a highlight video. The highlight video may be assembled by selecting portions of the videostream for recordation based on the relevance indicator transmitted in conjunction with the basic videostream. The user may then replay highlights of the basic videostream at a later time. The invention enables one to create a highlight video without the need for manual editing of the videostream, or for reviewing the entire video stream.

Accordingly, in one embodiment the invention provides a method of recording and replaying a videostream including the steps of receiving a basic videostream; in association with the basic videostream, receiving a relevance indicator; forming a highlight videostream recording, the highlight videostream recording including selected portions of the basic videostream, the selected portions selected based on the relevance indicator; and playing the highlight videostream for a user.

A further understanding of the nature and advantages of the inventions herein may be realized by reference to the remaining portions of the specification and the attached drawings.

DESCRIPTION OF THE PREFERRED EMBODIMENTS

Figure 1:
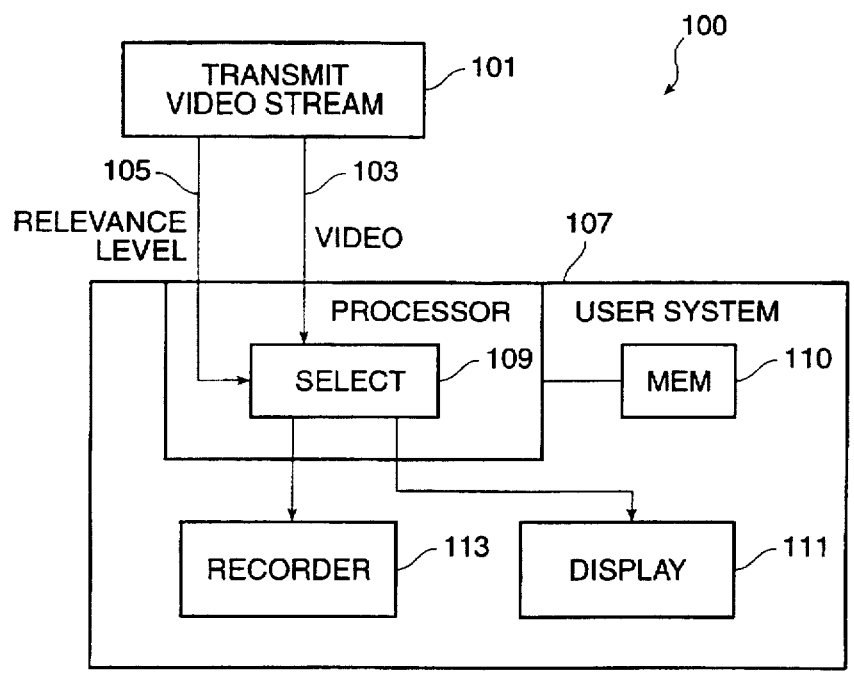
FIG. 1 is an overall block diagram of a video system according to one embodiment of the invention.

The present invention provides an improved videostream management system. The invention will have applicability to computer systems, television systems, or combinations of such systems.

Suppose a user is watching a particular videostream such as a sporting event. According to the system herein, the user indicates to the system that he/she wishes to stop watching an ongoing event, but wishes to return to the event later to review highlights of the videostream which will be missed during the user's absence. The system records selected portions of the videostream during the user's absence based on a relevance level transmitted with the videostream.

When the user returns, a portion of the videostream has been recorded, and may be reviewed at the user's leisure. The system desirably presents the user with a menu showing, among other things, the number of events that exceed a set relevance level, the number of minutes of video exceeding a set relevance level, and how many minutes the user desires to use to review the missed video. In the simplest embodiments, the system will simply play back all video above a threshold relevance level. In other embodiments the system will adjust the relevance level of the video to be played to "fit" it into a fixed playback time.

Suppose, for example, that the user has missed x minutes of video. Suppose the user will use y minutes to review the missed video while the next portion of the videostream is received. The system will, in a preferred embodiment, select highlights of x+y minutes of video. That is, the system will continue recording while the highlights are displayed. This will allow the user to "catch up" on the missed portion of the video as well as highlights of the extra time used for review.

In one embodiment, the system will assume that the y minutes of new video will, on the average, have the same relevance level as the x minutes of missed video. Therefore, the highlight video would initially be assumed to include x/(x+y) percent of the x minutes of missed video and y/(x+y) percent of the video transmitted during review of the highlights. In a preferred embodiment, the system will continuously adjust this ratio such that if, for example, little of relevance is happening during the y minutes of review, the system may display more of the x minutes of missed video. On the other hand, if the system becomes aware that a greater than expected amount of relevant material is being transmitted, the system may transmit less of the x minutes of video. The threshold relevance level for video to be displayed may also be adjusted to fit the highlights into the allotted time.

The relevance level is preferably transmitted with the videostream, but may be broadcast over a separate medium. For example, in one embodiment the videostream is a conventional NTSC video stream, and the relevance level is broadcast in the vertical blanking interval. Such technology is available using, for example, the Intel "Intercast" standard. In other embodiments, the videostream is broadcast over a digital medium or over a computer network. In such embodiments the relevance level may be broadcast in control or overhead bits in the digital videostream, over a cellular network, paging network, FM broadcast, or the like. Also, the relevance level may be generated within a receiver automatically based on an evaluation of the programming content.

The relevance level may take any of a number of forms. In one example, the relevance level is added by the broadcaster. The added relevance level is added by the broadcast network manually. In some cases, such as in the case of a sporting event, the relevance level may be added automatically either at the transmitter or receiver end. In the case of a sporting event, the crowd noise level will often be one indication of the excitement level of the sporting event and will be used as a relevance level (adding, preferably a time before and/or after a set noise level for display in addition to the time for which a noise level is exceeded). Accordingly, the relevance level will automatically increase as the noise level of the crowd at the sporting event increases. A buffer period may be added both before and after any such increases in noise level to allow context to be added to a particular event of interest.

In still other cases, the relevance level may take the form of a rating guide with, for example, material unsuitable for viewing by children carrying a low relevance level while suitable material carries a high relevance level. In this way, a recording system can automatically excise scenes including mature content.

The service provided herein may be provided as an optional service to a subscriber of a particular video service. In the case of conventional television signals, the user may subscribe to the highlight service through a cable service provider. Subscription-based services for optional services are known in the art and include television guide services such as disclosed in Young et al., U.S. Pat. No. 5,353,121. See also, U.S. Pat. No. 5,335,277, incorporated herein by reference for all purposes.

FIG. 1 is a block diagram of a videostream management system 100 according to one embodiment of the present invention. A videostream source 101 transmits a videostream 103 and a relevance level 105. The relevance level may be a measure of "excitement" in the videostream, the level of "interest" in, for example, an educational program, or any other measure of interest to a particular user or group of users. Multiple measures of relevance may be transmitted, in which case the user may select the desired measure of relevance, or level of relevance. In some cases, "default high" or "default low" measures may be applied by the broadcaster, such as in advertising such that a user is forced to view at least a portion of the advertising in a particular video broadcast.

The transmission of the broadcast stream may be from a remote site, or from the user site. For example, the broadcast station may be a cable head end, a satellite broadcast site, a hotel videotape machine, or a video source on a computer network. The user site may be an individual viewer or a group of viewers.

The user site receives the videostream and the relevance level at a system 107. A selection system 109 (using, for example, a microprocessor programmable logic device) determines if the user has set the system into a mode for recordation of highlights. If not, the videostream is passed directly to the display 111 which is preferably adapted to display an NTSC videostream. If the user has set the system into a mode for recordation of highlights, the videostream or parts of the videostream are passed to a recording device 113. Recording device 113 is, in some embodiments, a videotape recorder or optical disk system. In other embodiments, particularly those related to the distribution of a videostream in a computer network, the recording device is a computer hard disk or optical disk. Software for performing the operations herein is stored on memory 110 such as a ROM, RAM, EPROM, or magnetic or optical disk.

The selection system may select all of the video for recordation, and select among the recorded elements for playback at a later time, or it may select only elements having an interest level above a determined level for recordation. In the latter case, further filtering of the recorded material may take place when the recorded material is played back.

Figure 2:
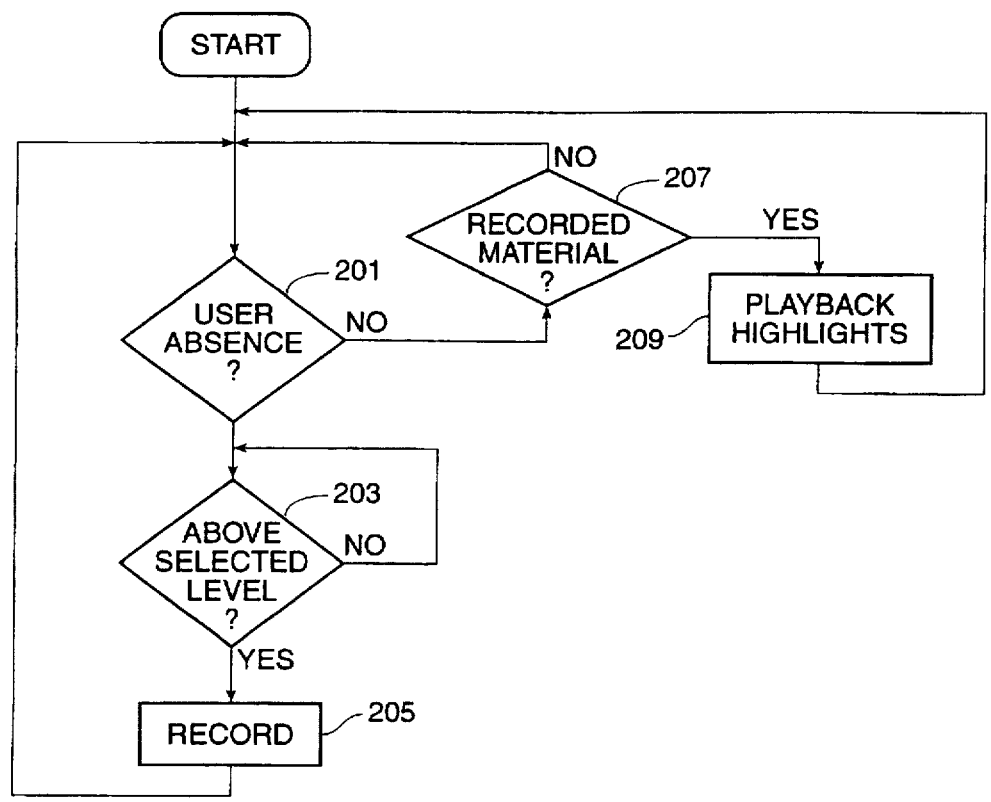
FIG. 2 illustrates selection of a portion of a videostream for recordation and playback.

FIG. 2 illustrates the process of recording and playing back selected elements of a videostream according to relevance level in one aspect of the invention. At step 201 the system determines if the user desires the record/playback features of the present invention. For example, the user may plan to be absent. If the features are desired, the currently received portions of the videostream become eligible for recording if their relevance level is high enough. If not, the system waits until there is an indication that the features are desired. The system may obtain input that the record/playback features would be desired from a variety of sources such as from a computer mouse, keyboard, a remote control device, or by visually observing the user depart the viewing area through an attached video camera.

At step 203 the system reads the relevance level of the videostream at a given time, and if the relevance level exceeds a preset value, records the videostream at step 205. In most embodiments the recording will take place for a fixed period of time (e.g., 1 minute) and the system will again determine if recording is still desired at step 201. When recording is no longer desired, for example, the user is no longer absent, and a check at step 207 determines that material has been recorded the system begins a playback process at step 209. After the playback is complete, the system again begins the process as previously discussed at step 201.

Figure 3:
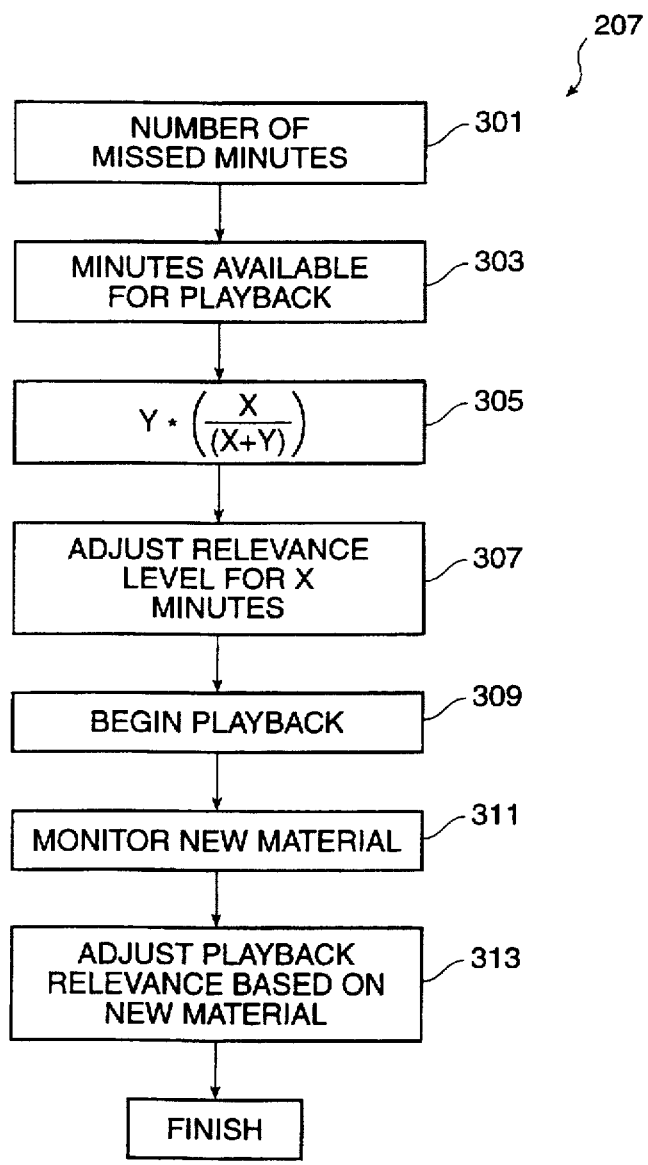
FIG. 3 illustrates the playback process in greater detail.

FIG. 3 illustrates the playback process at step 207 in greater detail. At step 301 the system inputs the length of the recording process of step 205, e.g., the number of minutes of video that have been missed. At step 303 the system determines the number of minutes available for playback based on user input or a default value. At step 305 the system calculates the number of minutes available to playback the missed video according to the formula $y*(x/(x+y))$. At step 307 the system adjusts the relevance level of the material to be played back downwards if necessary so that the already recorded material will fit into the calculated number of minutes available.

At step 309 the system begins playback, playing back only the material exceeding the relevance level set at step 307 such that the video will fit in the allotted percentage of the y minutes available. If the relevance level of the y minutes of video is the same as the x minutes of video, the highlights should fit directly into the y minutes available. However, at step 311 the system monitors the new material and, at step 313 the relevance level of material to be played back is adjusted if necessary. For example, if the relevance level goes up during playback, the system will gradually bring the necessary level for playback of material up such that less of the early material is played. In some embodiments a high threshold level is set above which the system will switch to "real time" if the current incoming video exceeds a selected value. In this way, events of very high interest are seen immediately despite the playback process.

The above description is illustrative and not restrictive. Many variations of the invention will become apparent to those of skill in the art upon review of this disclosure. Merely by way of example the invention is illustrated primarily with respect to television signals, but the invention is not so limited and may be applied to computer systems and others. The scope of the invention should, therefore, be determined not with reference to the above description, but instead should be determined with reference to the appended claims along with their full scope of equivalents.

What is claimed is:

1. A method of recording and replaying a videostream comprising the steps of:
   receiving a basic videostream;
   in association with said basic videostream, developing a relevance level indicative of user interest;
   forming a highlight videostream recording, said highlight videostream recording comprising selected portions of said basic videostream, said selected portions selected based on said relevance level; and
   playing said highlight videostream for a user; and wherein said step of receiving a videostream is a step of receiving an NTSC videostream, said relevance level broadcast in a vertical blanking interval of said videostream.

2. A method of recording and replaying a videostream comprising the steps of:
   receiving a basic videostream;
   in association with said basic videostream, developing a relevance level indicative of user interest;
   forming a highlight videostream recording, said highlight videostream recording comprising selected portions of said basic videostream, said selected portions selected based on said relevance level; and
   playing said highlight videostream for a user; and wherein said selected portions are selected by the steps of:
   identifying a time period of eligibility for recording;
   identifying a time period for review; and
   based on said time period of eligibility for recording and time period for review, selecting video for playback.

3. The method as recited in claim 2 wherein identifying a time period of eligibility for recording comprises identifying a time period of missed video.

4. The method as recited in claim 2 wherein identifying a time period of eligibility for recording comprises identifying a time period that a viewer was absent.

5. The method as recited in claim 2 wherein selecting comprises evaluating a threshold relevance level for playback according to x/(x+y) where x is said time of eligibility for recording and y is said time for review.

6. The method as recited in claim 5 wherein selecting further comprises adjusting said threshold relevance level for playback in accordance with variations in the relevance level of the videostream received during said time period for review.

7. A method of recording and replaying a videostream comprising the steps of:
   receiving a basic videostream;
   in association with said basic videostream, developing a relevance level indicative of user interest;
   forming a highlight videostream recording, said highlight videostream recording comprising selected portions of said basic videostream, said selected portions selected based on said relevance level; and
   playing said highlight videostream for a user; and wherein a threshold relevance level for playback is determined based on a time available for playback.

8. The method as recited in claim 7 wherein said threshold relevance level for playback is adjusted during playback.

9. A method of recording and replaying a videostream comprising the steps of:
   receiving a basic videostream;
   in association with said basic videostream, developing a relevance level indicative of user interest;
   forming a highlight videostream recording, said highlight videostream recording comprising selected portions of said basic videostream, said selected portions selected based on said relevance level; and
   playing said highlight videostream for a user; and wherein portions of said videostream above a selected relevance level within a first time period and a second time period are played back during said second time period.

10. The method as recited in claim 9 wherein said first time period is a missed time period.

11. The method as recited in claim 9 wherein said portions of said videostream above an elevated reference level above said selected reference level are displayed in real time during said second time period.

12. A highlight video system comprising:
    a video display;
    a receiver for receiving a videostream;
    a receiver for receiving a relevance level indicative of user interest; and
    a recorder, said recorder recording or playing back selected highlight video from said videostream on said video display, said selected highlight video having a selected relevance level; and
   wherein said receiver for receiving a videostream relevance level is an NTSC vertical blanking interval receiver.

13. A software product for use with a video management system, said product comprising:
    software for inputting a relevance level of an incoming videostream, said relevance level indicative of user interest;
    software for selecting portions of said videostream as eligible for playback where said portions exceed a selected relevance level; and
    a memory for storing the software; and
   wherein said software for selecting portions of said videostream comprises:
    software for identifying a time period of receiving video eligible for review;
    software for identifying a time period for review; and
    software for based on said time period of receiving video eligible for review and said time period for review, selecting video for playback.

14. The software product of claim 13 wherein said time period of receiving video eligible for review is a time period of missed video.

15. The software product of claim 13 wherein said relevance level is an excitement level.

16. The software product of claim 13 wherein said software for selecting determines which video to select based on a relationship of the form x/(x+y) where x is a time of missed video and y is a time of playback.

17. The software product of claim 13 further comprising software for selecting said selected relevance level.

18. A method of selecting highlight video for playback comprising the steps of:

inputting a crowd noise level of an event; and
playing back selected, recorded highlights of said event, said highlights selected based on said crowd noise level.

19. The method as recited in claim 18 wherein said selected highlights are those where said crowd noise level exceeds a value.

20. The method as recited in claim 18 wherein said value is preset.

21. The method as recited in claim 18 wherein said value is user defined.

22. The method as recited in claim 18 wherein said event is a sporting event.

* * * * *